United States Patent Office 3,296,661
Patented Jan. 10, 1967

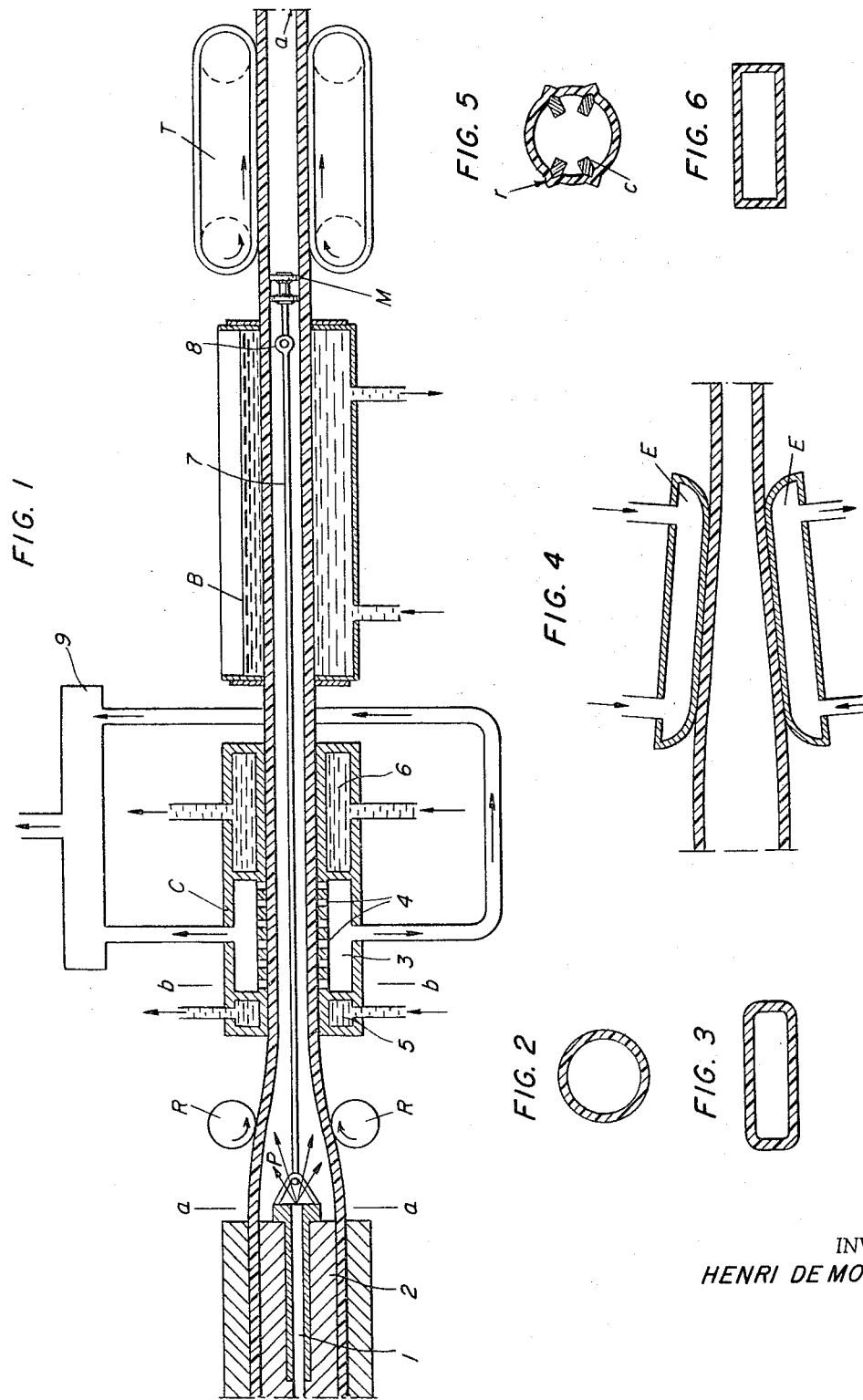

3,296,661
APPARATUS FOR EXTRUDING SUITABLY OUT-
LINED PARTS MADE OF THERMOPLASTIC
SYNTHETIC MATERIAL
Henri de Moustier, Clerval, Doubs, France
Filed Dec. 5, 1963, Ser. No. 328,246
Claims priority, application France, Dec. 7, 1962,
917,938
3 Claims. (Cl. 18—14)

It has already been proposed to produce hollow bodies by extruding thermoplastic synthetic materials through outlets provided with nozzles and which have a terminal outline which is that to be given to the finished hollow body. Generally, the outlines resorted to are tubular.

For each desired outline, it was necessary hitherto to resort to a particular nozzle adapted to provide only a well-defined outline. Since the nozzles required for extruding purposes are expensive and can only be obtained through an accurate machining which requires considerable time, the procedure is generally limited to such comparatively simple and easily made outlines which are required for mass production. The expenditure of money and time required for the making of a nozzle having a predetermined outline forms thus a heavy objection against its use as an elegant and simple extruding procedure for the making of hollow bodies having any desired outline, chiefly in the case of a limited number of articles or of articles intended for particular purposes.

Since the producer can generally not contemplate for economical reasons keeping a large store of nozzles, his manufacturing programme is limited to a small number of standard outlines. For the same reasons the making of tubes of synthetic material cannot be readily contemplated for any desired diameter, since naturally the possibility of supply is governed by the limited number of available nozzles the diameters of which are selected within the most usual values.

In the making of hollow tubular bodies of thermoplastic synthetic material, it has already been proposed to urge hollow bodies which are elastically deformable as they pass out of the extruding nozzle against the inner wall of a tubular gauging device under the action of a gaseous medium after which said hollow bodies are hardened through cooling. Such gauged tubes serves to give the hollow body an accurately defined outer diameter and in association with the compressed medium, they are adapted to prevent the collapse of the hollow body which is still soft when it passes out of the outlet and of the nozzle. To this end, the wall of the tube of synthetic material is urged against the inner wall of the gauged tube by compressed air fed through a bore in the punch extending inside the nozzle into the inside of the tube, or else, it is drawn against the inner wall of the gauged tube by a suction produced by a reduction in the pressure exerted on the outer peripheral surface of the tube. Simultaneously, a suitable cooling of the tube of synthetic material as it passes through the gauged tube provides for a further cooling and for a hardening of said tube of synthetic material as it passes out of the gauged tube, whereby it cannot be deformed any more.

The gauged tubes or nozzles which have been used hitherto for limiting the outer diameter of the synthetic material passing out of the extruding nozzle have served hitherto exclusively to constrain the shaped outline produced by the nozzle on the tube to remain unaltered during the cooling and hardening stages, or else, in the case of the maintenance of an annular shape, to merely bring said outline to the diameter desired, slightly larger than the diameter of the nozzle. In all cases, the outline of the hollow body is defined by the shape of the nozzle itself and is subjected at the utmost inside the gauged tube to a modification of its geometry.

The present invention has for its object to avoid the former difficulty met when extruding hollow bodies of any desired outline, to wit: the necessity of resorting to a particular nozzle for each desired outline and consequently the invention provides a method according to which it is possible to obtain with one and the same extruding press and more particularly with one and the same nozzle an economical production of a number of different outlines. The solution to said problem relies on the fact that the hitherto known gauging tubes mentioned hereinabove and serving for the making of tubular outlines may be produced in a substantially cheaper manner than the outlets for extruding presses with their expensive nozzles, while the original hollow body outline provided by the nozzle may be modified in special outline-shaping devices to be used in the same manner as the conventional gauging tubes, this modification being ensured as desired in a manner entirely independent of said original outline.

The method according to the invention is characterized by the fact that a number of different outlines for the hollow bodies may be obtained while using always the same nozzle having a simple standard outline, preferably a hollow cylindrical outline associated with at least one special outline-shaping device for each desired outline, the cross-section of which corresponds to the desired finished outline to be obtained for the hollow body, the still plastically deformable body of synthetic material extruded by the nozzle being submitted, as it passes through said device according to the usual procedure resorted to in the case of gauged tubes, to the action of a compressed medium which urges it against the inner wall of said outline-shaping device after which the hollow body is hardened by cooling.

Thus, it is possible by using a nozzle with a simple tubular outline to obtain not only hollow bodies with very different diameters, or else, having any regular outline, but also bodies with any desired irregular outlines provided with concave, or convex or even flat sections and also polygonal outlines with rectilinear or even incurved lateral surfaces. It is also possible to obtain in this manner flat films.

The procedure is similar to that of the making of endless hollow bodies and it is also suitable for the making of a succession of separate articles. The desired terminal outline can be obtained through the use of a single or else of several successive outline-shaping devices. In particular, it is possible to use a first outline-shaping device wherein the application of the hollow body against the inner wall of said first device is obtained through reduction in the pressure exerted on the outer peripheral surface of the hollow body while a second outline-shaping device serves for operating through an inner pressure applied during the last stage of the hardening procedure. This combination of several outline-shaping devices leads to an increase in the speed of production and therewith in the output of the shaped bodies which is otherwise defined by the time required for the cooling inside an outline-shaping device.

The invention will be now disclosed with further detail, reference being made to the accompanying drawings illustrating embodiments selected by way of examples of the carrying out of the method according to the invention. In said drawings:

FIG. 1 illustrates the arrangement for executing a hollow body of thermoplastic synthetic material having a predetermined cross-section.

FIG. 2 is a cross-section of the hollow body made of synthetic material.

FIG. 3 is a cross-section of a hollow body of synthetic material after it has passed through an outline-shaping device giving the hollow body a generally rectangular shape.

FIG. 4 is a diagrammatic cross-section through the jaws of a drawing out system acting on a hollow body.

FIGS. 5 and 6 are cross-sections of hollow bodies having outlines with sharp angles and which may be obtained through a simple modification of the conventional press outlet.

In the different figures, similar parts have been given the same reference numbers.

FIG. 1 shows a hollow body of thermoplastic synthetic material made by means of a conventional extruding press of which the outlet is constituted by a nozzle surrounding a punch 2. This punch 2 is provided with an axial opening 1 through which a compressed gaseous fluid is urged in a conventional manner into the projecting head P and thence into the hollow body of synthetic material. The pressure of said compressed medium is adjusted in a known manner which need not be described or illustrated with any further detail in the present specification.

The deformable hollow body illustrated cross-sectionally in FIG. 1 which has been extruded in the area $aa$ and which is still plastically deformable is shifted by hand at the beginning of the procedure into the inside of the outline-shaping device C and fed into the drawing out means T which draw out the hollow body during the procedure at a predetermined speed.

This drawing out speed at which the mass of synthetic material is fed out of the nozzle is adjusted in a suitable manner so that the speed of withdrawal is generally selected so as to be higher than the output speed, that is the actual speed of extrusion of the mass to be selected, so as to obtain an increase in the length of the originally extruded hollow body whereby an adjustment of the thickness of its wall is made possible. Furthermore, a speed of withdrawal of the hollow body which is higher than the extrusion speed makes the shaping to the desired outline easier while taking into account the original size of the hollow body passing out of the nozzle.

During this initial stage of the procedure, the right-hand end $e$ of the outline as shown in FIG. 1 which may be given any desired shape is closed by means of a plug which may be constituted for instance by a putty. There is then introduced at 1 into the inside of the hollow body a compressed medium so as to produce a constant pressure inside said body. Said inner pressure associated with the speed of progression of the then suitably adjusted drawing out means T causes the wall of the hollow body to engage the inner wall of the outline-shaping device C so that it assumes thus the desired terminal outline.

The rollers R, or the jaws E of the modification illustrated in FIG. 4, forming the drawing out means are maintained at a sufficiently low temperature by a circuit in which a cooling medium flows so as to prevent any adherence with the still warm thermoplastic material; simultaneously this furthers the transformation of the originally tubular cross-section of the body leaving the nozzle in the area $aa$ so that it may assume the cross-sectional shape defined by the outline of the outline-shaping device C.

In order to maintain constancy of the inner pressure, it is necessary, in the case of such a procedure for the free end $e$ of the hollow body to be sealed against loss of pressure. In the making of endless hollow bodies, this requirement leads to no special difficulties; in contradistinction, when producing hollow bodies to be cut into predetermined lengths, an additional closing is required at the end of the free hollow body after the cutting off of a predetermined length as well as a further raising of the inner pressure to the desired value, which operations are objectionable and lead to a considerable loss of time.

To this end it is advantageous to resort to an already known procedure according to which there is provided a reduction in the pressure acting on the outer periphery of the hollow body so as to exert a suction urging the latter against the inner wall of the outline-shaping device C. As shown in FIG. 1, the outline-shaping device encloses for this purpose a chamber 3 connected with a vacuum pump. The chamber 3 communicates through the port 4 with the inner chamber of the outline-shaping device so that the hollow body of synthetic material lying inside said device and which is urged at the start against the inner wall of the outline-shaping device under the action of the inner pressure continues being urged after the disappearance of said inner pressure against the inner wall of said outline-shaping device, this being ensured now by the reduction in pressure provided in the chamber 3.

The ports 4 are suitably distributed in registry with the periphery of the outer surface of the hollow body. Such a reduction in pressure avoids the necessity, when producing long hollow body elements cut transversely into sections, of closing the free end of the hollow body and of providing each time the required increase in the pressure inside the body.

It is thus possible to produce by resorting to suitable outline-shaping devices hollow body elements of any desired, even irregular shape and also hollow body sections of any desired length, this being done in an easy and convenient manner without any change in the nozzle at the output of the extruding press.

In order to suitably adjust the cooling of the hollow body passing through the outline-shaping device, the latter is provided as illustrated in FIG. 1 with the cooling chambers 5 wherein a cooling fluid is caused to flow so as to ensure a preliminary cooling.

Thus, the mass of synthetic material is subjected to the optimum temperature for its shaping as it enters said outline-shaping device. Further similar chambers 6 provided at the output end of the outline-shaping device are fed with a colder cooling medium so that the mass of synthetic material may be subjected after shaping and before leaving said device to a temperature lower than its deformation temperature. In order to obtain this desired cooling in a reliable manner, the size of the outline-shaping device is selected in accordance with the speed of drawing out of the hollow body and therefore in accordance with the time available for the cooling procedure.

Instead of resorting to a single outline-shaping device, it is also possible to use several successive outline-shaping devices of the type described through which the hollow body to be extruded passes in succession; furthermore, it is possible to finish the cooling of the outline of the synthetic material at a point beyond the outline-shaping device or devices by means of a conventional cold water bath. When the shape and size of the outline of the hollow body permits such a procedure, it is advantageous to provide, beyond a first outline-shaping device operating under a reduced pressure, a second outline-shaping device wherein the hollow body which is already cooled to more or less greater extent, and is subjected to an inner pressure, the length available for cooling being then longer so that it is possible to operate with higher travelling speeds and consequently to proceed more efficiently.

In order to obtain the sealing means required for producing an inner pressure inside the hollow body of synthetic material, it is possible, as illustrated in FIG. 1, to secure to the end of the punch 2 a yielding cable 7 provided at a suitable point, preferably that designated by the reference number 8, with an arrangement which allows speedily securing a diaphragm of rubber for instance between two rigid flanges M. Such a diaphragm serves for closing during operation the inner chamber formed by the synthetic material, while the inner pressure is being applied at a suitable point of the corresponding outline-shaping device.

During the operative stage corresponding to the application of a reduced pressure, it is possible to provide the already cooled section of the hollow body of synthetic material, progressing beyond the passage through one or more outline-shaping devices and a water bath B if any, with an opening which allows inserting the closing diaphragm M and the adjustment of said diaphragm inside the outline of the synthetic material without this requiring a stopping of the extrusion procedure. After said insertion and adjustment of the diaphragm, it is possible to proceed with the above-mentioned operative step resorting to an inner pressure.

In FIG. 2 is shown the cross-section of an annular hollow body of synthetic material of which the shape may be transformed as described through one or more outline-shaping devices into a rectangular outline with rounded corners as illustrated in FIG. 3. Generally, it is not possible to obtain directly, when starting from an originally tubular extruded outline, final outlines other than angular outlines having slightly rounded corners, as illustrated in FIG. 3. In fact, in order to transform an originally round outline directly into an outline with sharp angles, it would be necessary to resort to a very high pressure or reduction in pressure and this would always remain within limits governed by the plastic behaviour of the warm extruded synthetic material.

In order to cut out such difficulties in the obtaining of sharp angled outlines, it is possible, according to a further embodiment of the invention, to produce such outlines with accurately formed angles through a slight modification of the conventional outlet of the extruding press. As illustrated in FIGS. 5 and 6, the peripheral surface of the conventional punch 2 associated with a conventional nozzle is provided with angular wedges c in a manner such that these wedges form the desired angles which depend on the longitudinal size to be contemplated and the outer section of the cylindrical nozzle is correspondingly provided with grooves, as illustrated at r in FIG. 5.

The invention is by no means limited to the disclosed embodiments disclosed of systems for carrying out the improved method described and it may be performed, as already mentioned, by selecting any desired suitably designed outline-shaping device while using one and the same nozzle with a view to obtaining endless or sectional hollow bodies of synthetic material of any desired outline. In particular, it is also possible to obtain flat films of synthetic material by urging the extruded mass of synthetic material under the action of pressure or of a reduction in pressure into contact with a corresponding flat surface forming part of an outline-shaping device, whereby through selection of a suitable travelling speed and of a predetermined value for the pressure to be applied, the stresses to which the film is subjected may be modified, as desired, both as to intensity and to direction.

What I claim is:
1. In combination with an extruding press for the extrusion of warm hollow bodies of thermoplastic material and having an outlet consisting of a nozzle having a given outer periphery surrounding a punch provided with an opening;
   (A) means for passing compressed gas through said opening and into said hollow body as the said body is extruded from said press at a predetermined extrusion speed;
   (B) first drawing out means positioned immediately after said nozzle for pulling out and preliminarily shaping said hollow body;
   (C) an outline-shaping device having the cross-section to be given to the hollow body and adapted to receive said hollow body coming from said first drawing means and having a first cooling chamber wherein said hollow body is preliminarily cooled; a suction chamber having perforated walls for urging the outer periphery of said hollow body thereagainst and means for applying suction to said chamber; a second cooling chamber for further cooling the hollow chamber;
   (D) a diaphragm adapted to be removably fitted in the outer end of said hollow body;
   (E) means controlled from said nozzle to set said diaphragm into position;
   (F) second drawing means for drawing out said hollow body at a speed greater than said extrusion speed so as to obtain an increase in the length thereof.

2. The combination of claim 1, wherein a number of dihedrally-shaped wedges are removably fitted in the outer periphery of said nozzle in a number equal to the sharp angles to be provided in said hollow body.

3. The combination of claim 1, wherein there is provided a cooling bath between said outline shaping device and said second drawing out means.

References Cited by the Examiner
UNITED STATES PATENTS

| | | | |
|---|---|---|---|
| 2,209,643 | 7/1940 | Chamblin | 264—177 |
| 2,230,309 | 2/1941 | Reed | 264—177 |
| 2,687,997 | 8/1954 | Marchand | 264—177 |
| 2,736,897 | 2/1956 | Parsons | 264—177 |
| 2,814,071 | 11/1957 | Allan et al. | 264—95 |
| 3,169,272 | 2/1965 | Maxson | 18—19 |
| 3,213,165 | 10/1965 | Pollock. | |
| 3,229,005 | 1/1966 | Reifenhauser | 264—171 |

ROBERT F. WHITE, *Primary Examiner.*

L. S. SQUIRES, A. R. NOE, *Assistant Examiners.*